United States Patent
Sawahashi et al.

(10) Patent No.: US 8,031,739 B2
(45) Date of Patent: Oct. 4, 2011

(54) BASE STATION AND DOWNLINK CHANNEL TRANSMISSION METHOD

(75) Inventors: Mamoru Sawahashi, Yokohama (JP); Kenichi Higuchi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 79 days.

(21) Appl. No.: 12/161,153

(22) PCT Filed: Jan. 10, 2007

(86) PCT No.: PCT/JP2007/050173
§ 371 (c)(1),
(2), (4) Date: Oct. 14, 2008

(87) PCT Pub. No.: WO2007/083549
PCT Pub. Date: Jul. 26, 2007

(65) Prior Publication Data
US 2010/0158256 A1    Jun. 24, 2010

(30) Foreign Application Priority Data

Jan. 17, 2006   (JP) ................................ 2006-009296

(51) Int. Cl.
*H04B 7/216* (2006.01)
(52) U.S. Cl. ...................................................... 370/441
(58) Field of Classification Search ........................ None
See application file for complete search history.

(56) References Cited

U.S. PATENT DOCUMENTS

| | | | |
|---|---|---|---|
| 5,309,474 A | 5/1994 | Gilhousen et al. | |
| 7,197,288 B1 * | 3/2007 | Ngan et al. | 370/331 |
| 2003/0072282 A1 | 4/2003 | Liang | |
| 2004/0075562 A1 * | 4/2004 | Land | 455/404.2 |
| 2004/0092235 A1 | 5/2004 | Li et al. | |
| 2004/0131007 A1 * | 7/2004 | Smee et al. | 370/208 |
| 2004/0152473 A1 | 8/2004 | Kuwano et al. | |
| 2004/0166901 A1 | 8/2004 | Umesh et al. | |
| 2005/0074024 A1 * | 4/2005 | Kim et al. | 370/432 |
| 2007/0098050 A1 * | 5/2007 | Khandekar et al. | 375/146 |
| 2008/0285534 A1 * | 11/2008 | Dent | 370/342 |
| 2010/0014660 A1 * | 1/2010 | Kishiyama et al. | 380/31 |

FOREIGN PATENT DOCUMENTS

JP    2003-23675 A    1/2003

(Continued)

OTHER PUBLICATIONS

Office Action in Taiwanese Patent Application No. 096101418, dated Sep. 16, 2010, with English translation thereof (8 pages).

(Continued)

*Primary Examiner* — Anh-Vu Ly
(74) *Attorney, Agent, or Firm* — Osha • Liang LLP (57) ABSTRACT

Under a sectorized cell architecture in a mobile communication system, a scrambling code applied to multiplication of a transmission signal is selected and switched among different types of downlink physical channels in a unified manner. One of multiple transmission signals to be transmitted on a corresponding one of the different types of downlink physical channels is generated. A first code is selected according to the type of the physical channel to enable multiplying the transmission signal by the first code. The transmission signal is multiplied by an intracell common scrambling code used in common among sectors in a same cell in addition to or in place of the multiplication of the first code. The transmission signal multiplied by at least one of the first code and the intracell common scrambling code is transmitted on the corresponding physical channel.

19 Claims, 11 Drawing Sheets

FOREIGN PATENT DOCUMENTS

| | | |
|---|---|---|
| JP | 2004-221760 A | 8/2004 |
| JP | 2005-341317 A | 12/2005 |
| JP | 3940414 B2 | 7/2007 |
| WO | WO-2004/021616 A1 | 3/2004 |
| WO | WO-2004/051882 | 6/2004 |

OTHER PUBLICATIONS

Patent Abstracts of Japan, Publication No. 2003-023675, dated Jan. 24, 2003, 1 page.

Written Opinion issued in PCT/JP2007/050173, mailed on Mar. 20, 2007 (no translation), 4 pages.

International Search Report issued in PCT/JP2007/050173, mailed on Mar. 20, 2007, with translation, 5 pages.

Taiwanese Office Action for Application No. 096101418, mailed on Jan. 27, 2011 (8 pages).

* cited by examiner

BASE STATION AND DOWNLINK CHANNEL TRANSMISSION METHOD

FIELD OF THE INVENTION

The present invention generally relates to a downlink channel transmission technique for mobile communication systems, and more particularly, to a downlink channel transmission method and a base station structure for implementing multiplication of scrambling codes according to the types of physical channels under unified control.

BACKGROUND ART

With a conventional WCDMA downlink transmission scheme, a spreading code is generated by combining
(1) a scrambling code using a long-period pseudorandom sequence; and
(2) a channelization code using an orthogonal code.

A channelization code is used to identify each of the physical channels used in a sector, and a set of mutually orthogonal codes (the number of which generally equals a spreading factor) is allocated to each of the sectors.

A scrambling code is a unique one allocated to each of the sectors, and it has a long period as long as 10 ms frame length.

Figure 1:
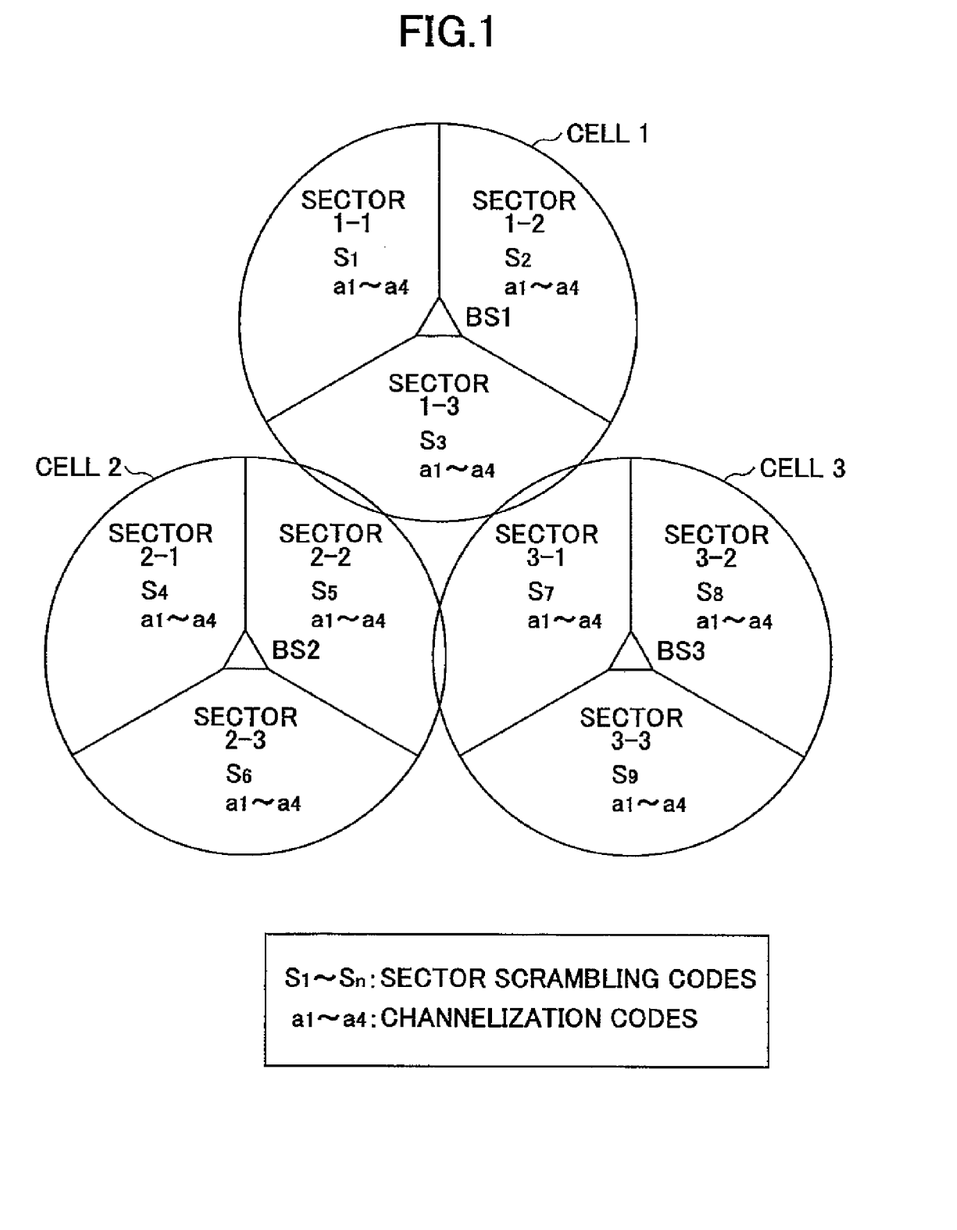
FIG. 1 is a schematic diagram illustrating a conventional technique for allocating spreading codes in a W-CDMA scheme.

FIG. 1 is a schematic diagram illustrating an example of spreading codes allocated to each of the sectors in a WCDMA radio access scheme. The cell 1 managed by base station (BS) 1 is divided into sectors 1-1, 1-2, and 1-3. Each of the sectors 1-1, 1-2, and 1-3 is assigned one of unique scrambling codes S1, S2 and S3. By allocating different scrambling codes to different sectors, the number of accessing users (i.e., the system capacity) can be increased.

Because different scrambling codes are allocated to each of the sectors 1-1 through 1-3 in a cell, a set of channelization codes a1-a4 is commonly used in the sectors 1-1 through 1-3. The number of channelization codes, four in this example, is on the assumption of the spreading factor 4.

Similarly, in cell 2 managed by the base station (BS) 2, a set of channelization codes a1-a4 is commonly used in sectors 2-1 through 2-3, while unique scrambling codes S4, S5, and S6 are allocated to the sectors 2-1, 2-2, and 2-3, respectively. The same applies to cell 3 managed by the base station (BS) 3, in which a set of channelization codes a1-a4 is commonly used in the sectors 3-1 through 3-3, while unique scrambling codes S7, S8, and S9 are allocated to the sectors 3-1, 3-2, and 3-3, respectively.

In this manner, the influence on a downlink signal transmitted in a sector due to interference from other sectors under the same base station and interference from adjacent cells is randomized by multiplying the transmission signal by a scrambling code unique to the sector.

However, under a sectorized cell architecture, the orthogonality of the orthogonal codes may be degraded due to the multiplication of the scrambling code unique to a sector, and as a result, intersector interference may arise. To be more precise, assuming that, in cell 1, channelization code a1 is allocated to user 1 located in sector 1-1 and channelization code a2 is allocated to user 2 located in sector 1-2, then, spreading code C1 of the user 1 and the spreading code C2 of the user 2 are expressed as $C1=a1*S1$, and $C2=a2*S2$.

In this case, if receiving timings of signals transmitted from different sectors of the same base station are the same, or if the difference in the receiving timings is absorbed in the guard interval under OFDM radio access, the orthogonality achieved by the channelization codes a1 and a2 is impaired due to the multiplication by the individual scrambling codes, and non-orthogonal code sequences are produced. Consequently, intersector interference occurs under the same base station, and the intended signal transmission property may be degraded.

SUMMARY OF THE INVENTION

Technical Issues to be Solved by the Invention

With the conventional spreading code allocation technique described above, the signal transmission property may be degraded, without achieving the originally designed level, due to intersector interference in the cell.

In view of the problem, the present invention aims to provide a novel channel transmission technique that can maintain the orthogonality between sectors in a cell and reduce the intersector interference, regardless of the types of physical channels such as pilot channel, broadcast channel, control channel, or data channel, in downlink transmission in OFDM radio access.

It is also an objective of the invention to provide a channel transmission method capable of controlling the intersector orthogonalization for the physical channels under unified rules.

Means for Solving the Technical Issues

To achieve the objectives, a first code is selected from multiple code patterns according to the type of the physical channel being used to transmit the transmission to multiply the transmission signal by the first code under unified control.

Depending on the type of the physical channel, the transmission signal is be further multiplied by an intracell common scrambling code that is unique to each cell and used commonly among the sectors in the cell, in addition to the first code. Alternatively, depending on the type of the physical channel, a transmission signal may be multiplied only by the intracell common scrambling code, without the application of the first code.

Furthermore, depending on the type of the physical channel, application of the first code and/or the intracell common scrambling code to the transmission signal may be combined with delay diversity between sectors in the same base station or cell. In this case, the signals having propagated through the respective sectors will be combined and received in OFDM radio access, and consequently, the diversity effect and the signal transmission characteristics are improved.

To be more precise, in the first aspect of the invention, a downlink channel transmission method includes the steps of
(a) generating one of multiple transmission signals to be transmitted on a corresponding one of different types of downlink physical channels used in a mobile communication system with a sectorized cell architecture;
(b) selecting a first code according to the type of the corresponding physical channel to multiply the transmission signal by the first code;
(c) multiplying the transmission signal by an intracell common scrambling code used in caution among sectors in a same cell; and
(d) transmitting the transmission signal multiplied by at least one of the first code and the intracell common scrambling code on the corresponding physical channel.

In the second aspect of the invention, a base station used in a mobile communication system to manage a sectorized cell is provided. The base station includes (a) a signal generator configured to generate one of multiple transmission signals to be transmitted by a corresponding one of different types of physical channels;
(b) a multiplication code switching unit configured to select and output a first code according to the type of the physical channel to be used to transmit the transmission signal in an unified manner, the selected first code being multiplied by the transmission signal;
(c) a scrambling code multiplication unit configured to apply an intracell common scrambling code commonly used among sectors in the sectorized cell to the transmission signal; and
(d) a transmission unit configured to transmit the transmission signal multiplied by at least one of the first code and the intracell common scrambling code.

In a preferred example, the transmission unit may have a delay unit for performing delay diversity transmission.

As an exemplified structure, the multiplication code switching unit selects and switches the first code among an orthogonal code orthogonal between the sectors of the cell, a sector unique scrambling code, and a MBMS unique scrambling code unique to each of multimedia broadcasting and multicasting service channels, and outputs the pattern of the selected code.

In another example, the multiplication code switching unit may be configured to output the pattern of the orthogonal code when spectrum spreading is applied to the transmission signal transmitted by a shared data channel or an associated control channel associated with the shared data channel, and output the pattern of the sector unique scrambling code when spectrum spreading is not applied.

ADVANTAGES OF THE INVENTION

When a downlink physical channel is transmitted in a mobile communication system with a sectorized cell architecture, intersector interference in a cell and influence of interference from adjacent cells can be reduced.

The code multiplication process for reducing intersector interference in the cell can be controlled for the different types of physical channels in a unified manner. Consequently, high-quality and efficient signal transmission is realized.

| LIST OF SYMBOLS | |
|---|---|
| 10 | Base station |
| 11 | signal generator |
| 12 | channel coding and data modulation unit |
| 13 | channel-type-based multiplication code switching unit |
| 15 | intracell common scrambling code multiplication unit |
| 18 | transmission unit |
| 19 | delay unit |
| 20 | multiplication control unit |

DETAILED DESCRIPTION OF THE PREFERRED EMBODIMENTS

The preferred embodiments of the present invention are now described in conjunction with the attached drawings.

Figure 2:
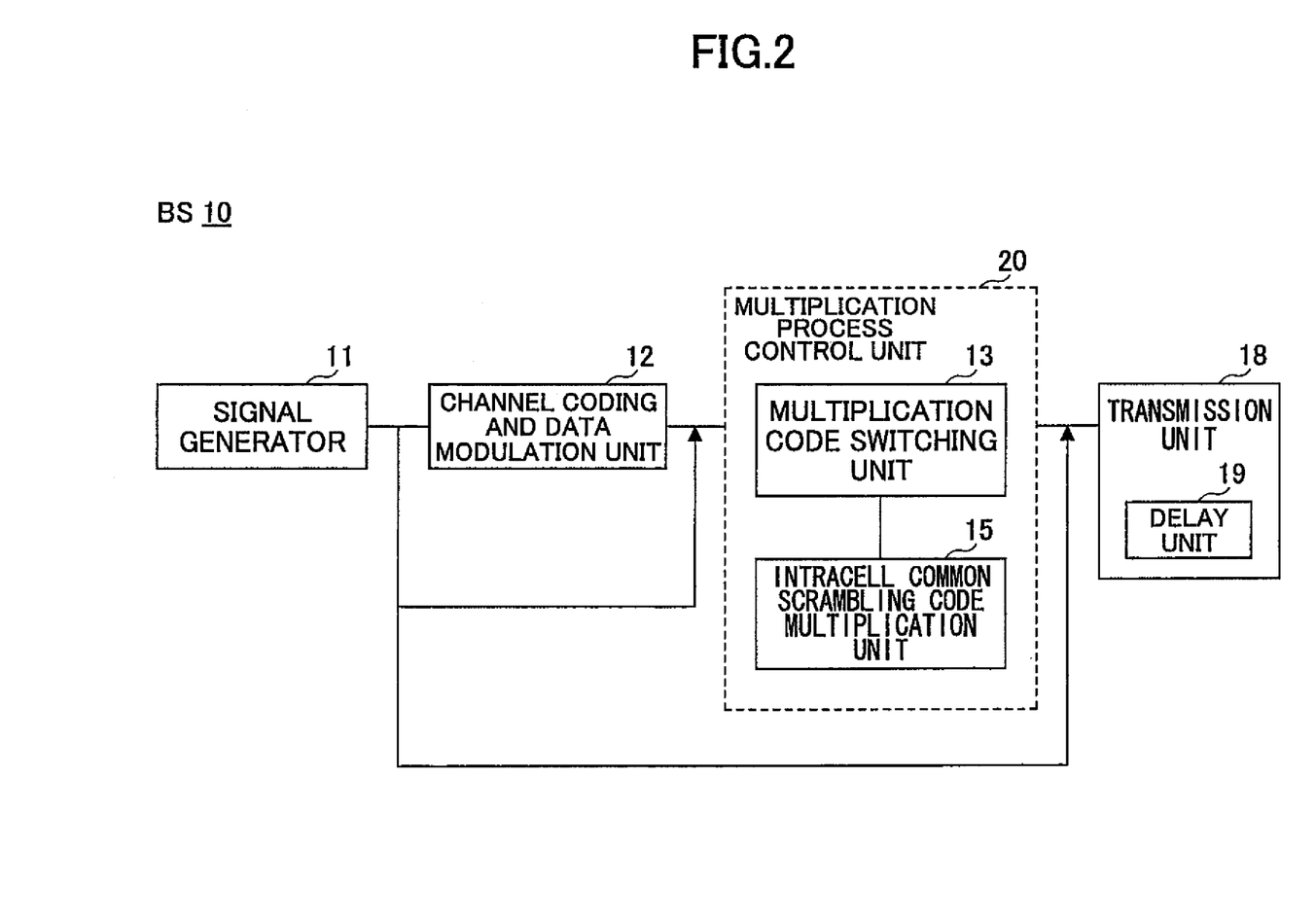
FIG. 2 is a schematic block diagram of a base station according to an embodiment of the invention.

FIG. 2 is a schematic block diagram of a base station 10 according to an embodiment of the invention. The base station 10 has a signal generator 11, a channel coding and data modulation unit 12, a multiplication process control unit 20, and a transmission unit 18. The base station 10 supports a cell divided into multiple sectors for increasing the capacity as illustrated in FIG. 1.

The signal generator 11 generates various types of transmission signal sequences, including a pilot signal to be transmitted on a pilot channel, system information to be transmitted on a broadcast channel, a synchronizing signal to be transmitted on a synchronization channel, a paging signal or a paging indicator to be transmitted on a paging channel or paging indicator channel, user data or upper-layer control signals to be transmitted on a shared data channel, control data to be transmitted on a control channel (such as Layer 1/Layer 2 control channel) associated with the shared data channel, and multimedia broadcast multicast service (MBMS) data to be transmitted on a MBMS channel.

The channel coding and data modulation unit 12 generates a channel coding sequence (error correcting code) at a predetermined coding factor and performs data modulation using a modulation scheme such as QPSK or 16 QAM. Depending on the type of the physical channel, the coding factor and the modulation scheme may be fixed, or alternatively, an appropriate modulation scheme and coding factor may be selected and combined according to the conditions of the radio link to perform adaptive modulation and coding.

The multiplication process control unit 20 includes a channel-type-based multiplication code switching unit (referred to simply as "multiplication code switching unit") 13, and an intracell common scrambling code multiplication unit 15. The multiplication code switching unit 13 selects (or switches) and applies a multiplication code (first code) to a transmission signal according to the type of the physical channel on which the transmission signal is to be spread. The intracell common scrambling code multiplication unit 15 further applies an intracell common scrambling code to the transmission signal having been multiplied by the first code.

The intracell common scrambling code is a code used in common among the sectors in the cell covered by the base station 10.

In the sectorized cell architecture, influence of interference from the adjacent cells can be randomized and intersector interference can be greatly reduced by multiplying the transmission signal by the multiplication code selected according to the channel type and by the intracell common scrambling code.

The transmission unit 18 transmits a radio transmission signal having been subjected to the multiplication process, and it transmits a radio transmission signal that has not been subjected to the multiplication process depending on the type of the physical channel. The transmission unit 18 includes a delay unit 19 that produces delay diversity effect. To achieve time delay diversity, modulated waves are intentionally delayed and transmitted after a predetermined delay period of time.

It should be noted that, depending on the type of the physical channel used in the cell, some channels may be transmitted after scrambling multiplication without modulation and channel coding, and some channels may be transmitted without modulation, channel coding or scrambling multiplication, as explained below in conjunction with FIG. 3 through FIG. 10.

Figure 3:
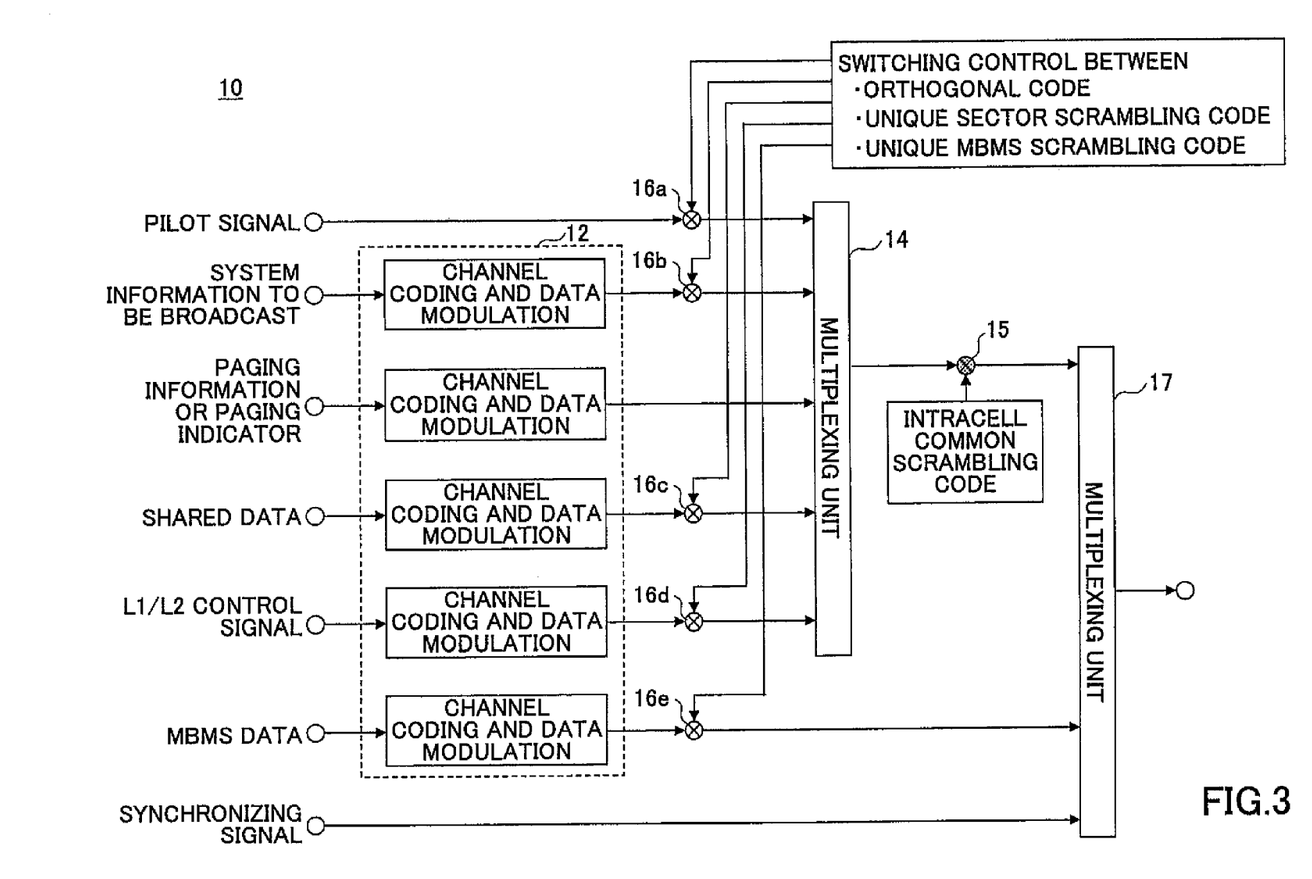
FIG. 3 illustrates an example of channel transmission carried out at the base station shown in FIG. 2.

FIG. 3 is a diagram for explaining the operation of the base station 10 shown in FIG. 2. Pilot signals, broadcast information (such as system information), shared data, Layer 1/Layer 2 (L1/L2) control signals, and MBMS data are multiplied by the corresponding first codes at the corresponding multipliers 16a through 16e. Examples of the first code include an orthogonal code, a unique sector scrambling code, and a unique multimedia-broadcast-multicast-service (MBMS) scrambling code. Except for the pilot signal, the signals to be multiplied by the first code have substantial information content, and accordingly, adaptive modulation and coding is applied to these signals at the channel coding and data modulation unit 12 prior to the multiplication process.

The multiplication code switching unit 13 controls and switches the pattern of the first code to be output according to the physical channel being used, and supplies the selected first code to the associated one of the multipliers 16a through 16e. The signals multiplied at the multipliers 16a through 16e are input to the multiplexing unit 14. The multiplexed signal is supplied to the intracell common scrambling code multiplication unit 15 so as to be further multiplied by an intracell common scrambling code.

On the other hand, paging information or a paging indicator is supplied to the multiplexing unit 14 without the multiplication by a first code because the paging information or the paging indicator is sent from the network to all the users located in the location registration area covering multiple cells. The paging information or the paging indicator is multiplexed with other signals, and then subjected to scrambling spread at the intracell common scrambling code multiplier 15. Regarding synchronizing signals, code multiplication is not applied to the synchronizing signal.

The above-described transmission signals are multiplexed at multiplexing unit 17, and transmitted from the transmission unit 18 (see FIG. 2), subjected to the delay diversity process as necessary.

Next, explanation is made of individual physical channels for propagating the above-described transmission signals.

<Pilot Channel>

Figure 4:
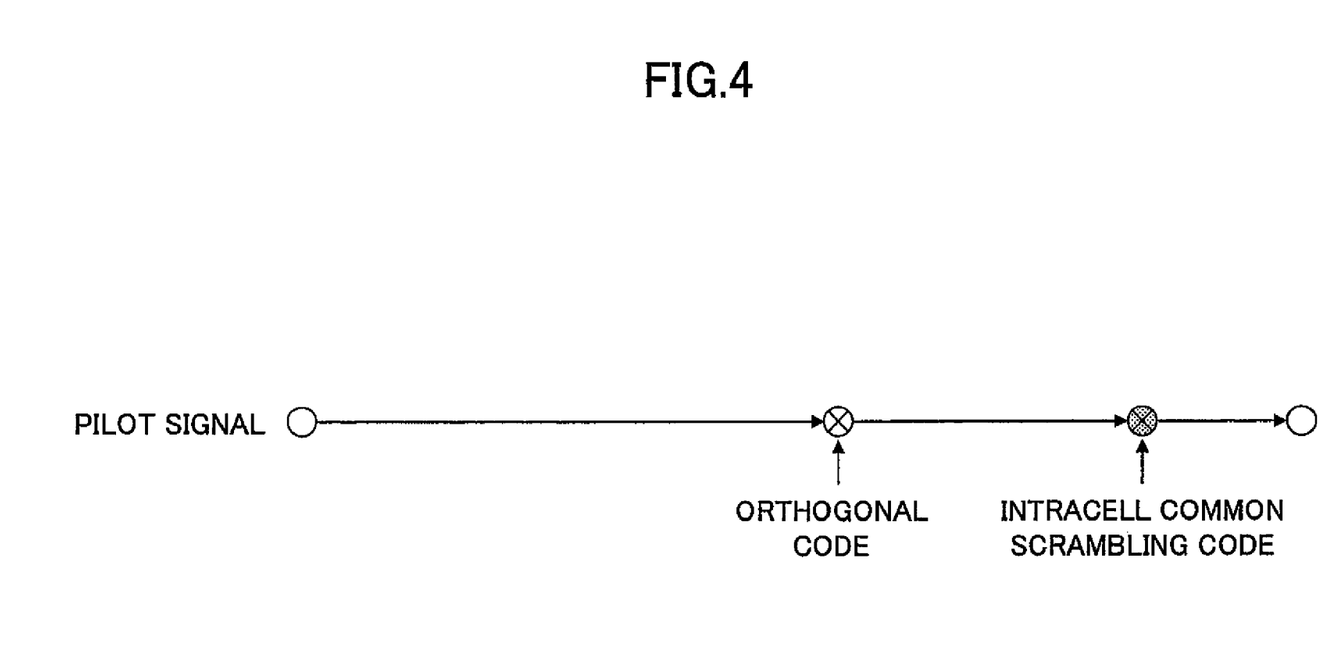
FIG. 4 is a schematic diagram for explaining an operation performed on a pilot channel.

FIG. 4 is a schematic diagram illustrating an operation performed on a pilot channel. The pilot channel is a reference signal whose pattern is known in advance to both the base station and mobile terminals. The pilot channel is used for the purpose of:

identification of a cell and sectors;

measurement of the power level of the received signal from each of the sectors to carry out cell search or handover;

measurement of channel conditions to carry out link adaptation or packet scheduling; or symbol synchronization for synchronous detection (demodulation) and channel estimation.

When sectorized cell architecture is employed, the pilot signal transmits a pilot pattern unique to each sector.

The pilot signal transmitted on the pilot channel is multiplied by (1) an orthogonal code (the first code) which is orthogonal between sectors in the cell; and (2) an intracell common scrambling code.

A set of orthogonal codes is allocated such that the pilot channel becomes orthogonal between sectors in the cell (i.e., the geographical area supported by a base station). The orthogonal code can be generated using a Walsh-Haramard code or phase rotation. The orthogonalized pilot channel is further multiplied by an intracell common scrambling code used in common among the sectors in the same cell (base station) to perform scrambling spread. Accordingly, influence from the adjacent cells can be reduced, while the orthogonality of the pilot channels is maintained between sectors in the same base station. This arrangement is advantageous to achieve accurate measurement of received power levels and channel conditions under reduced intersector interference.

Since the pilot signal does not contain substantial information content, multiplication of the orthogonal code for identification of each sector in the cell and multiplication of the intracell common scrambling code for identification of the cell are carried out without channel coding and data modulation.

<Broadcast Channel>

Figure 5:
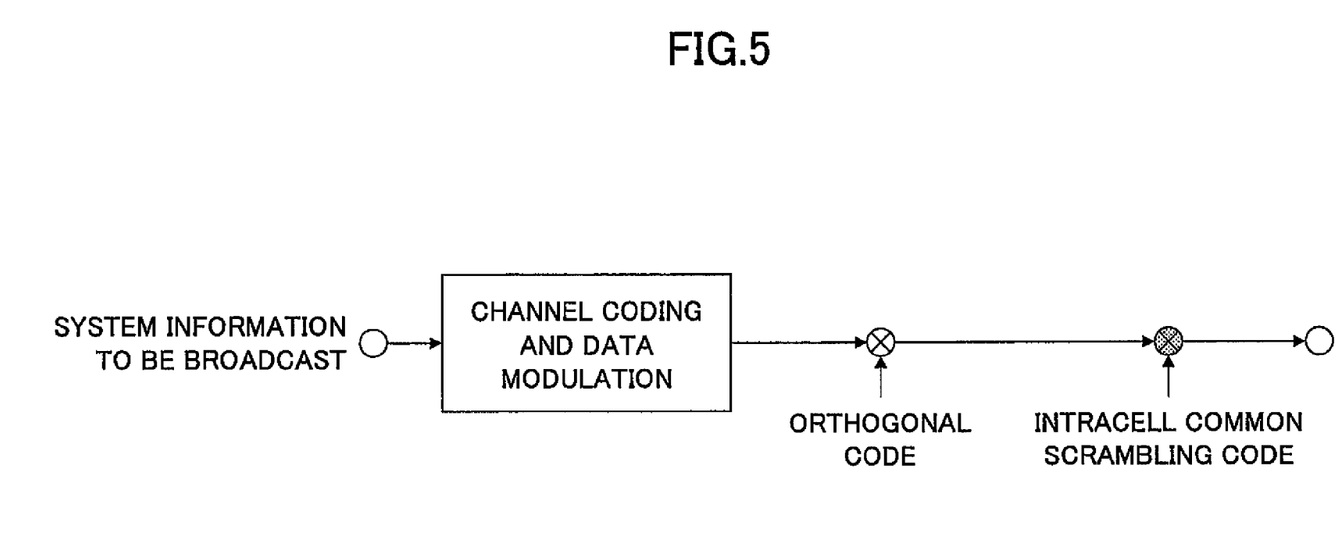
FIG. 5 is a schematic diagram for explaining an operation performed on a broadcast channel.

FIG. 5 is a schematic diagram illustrating an operation performed on a broadcast channel. A broadcast channel is transmitted on a downlink to broadcast system information (such as location registration information) required to establish the initial link connection. The broadcast channel transmits information unique to each sector.

The system information transmitted on the broadcast channel is subjected to channel coding and data modulation. The broadcast channel transmits information unique to each sector, like the pilot channel, and accordingly, the channel-coded and data-modulated broadcast signal is multiplied by:

(1) an orthogonal code (the first code) which is orthogonal between sectors in the cell; and (2) an intracell common scrambling code.

A set of orthogonal codes is allocated such that the broadcast channel becomes orthogonal between sectors in the cell. The orthogonalized broadcast channel is further multiplied by the intracell common scrambling code (used in common among the sectors in the cell) to convert the interference from the adjacent cells into white noise.

This arrangement can achieve high-quality transmission of the broadcast channel by reducing both influence of interference from adjacent cells and intersector interference in the cell.

<Synchronizing Channel>

Figure 6:
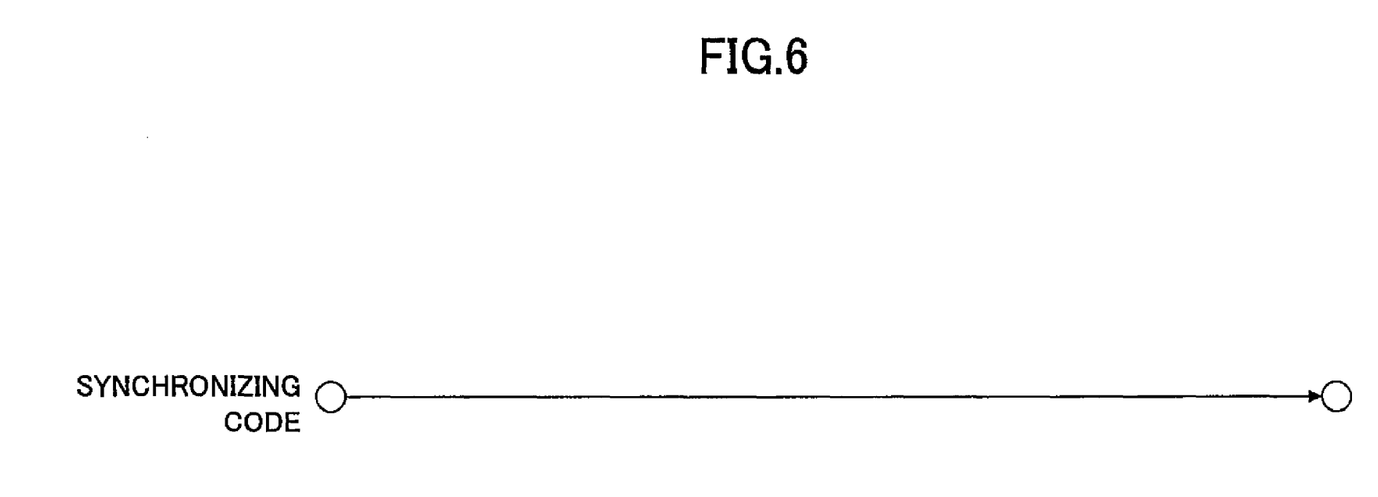
FIG. 6 is a schematic diagram for explaining an operation performed on a synchronization channel.

FIG. 6 is a schematic diagram illustrating how a synchronizing channel is treated in the embodiment. The synchronizing channel is used for initial synchronization for cell search and establishment of a downlink.

The synchronizing channel does not contain substantial information content, and therefore, code multiplication is not applied to the synchronizing channel.

<Paging Channel>

Figure 7:
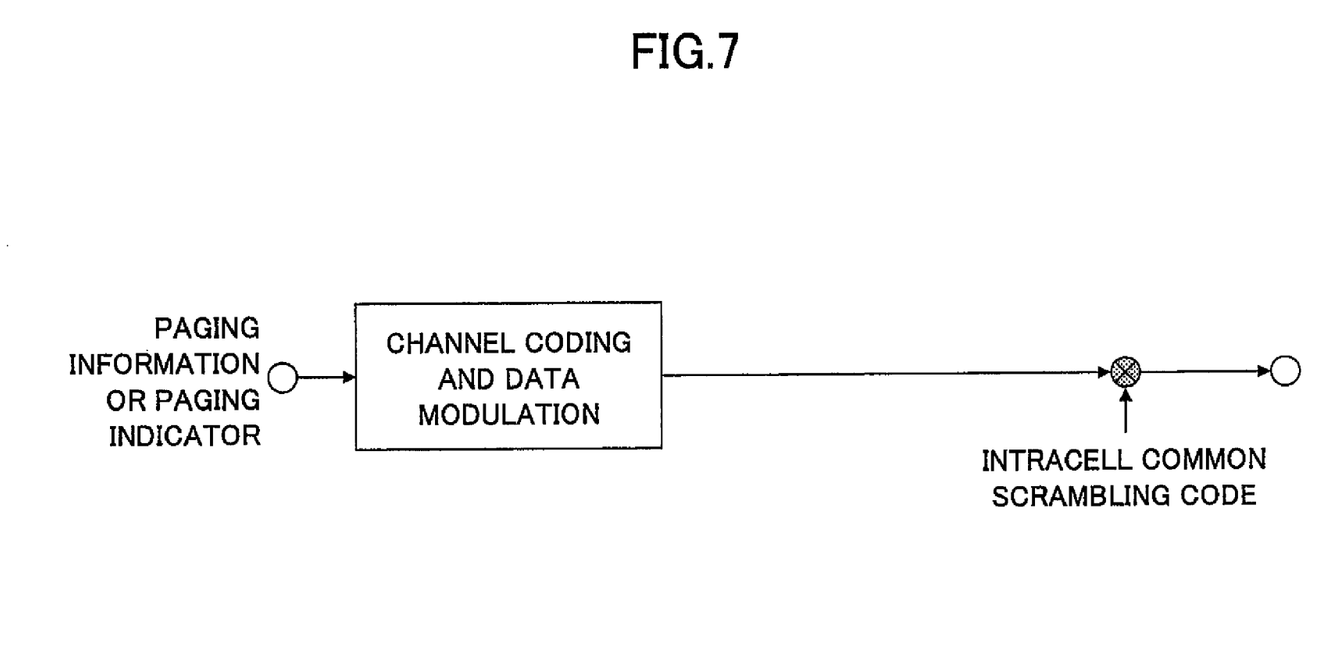
FIG. 7 is a schematic diagram for explaining an operation performed on a paging channel.

FIG. 7 is a schematic diagram illustrating an operation performed on the paging channel. The paging channel is used to report incoming calls or packets at certain intervals from the network to all the user terminals located and registered in the location registration area. The location registration area is spread to a certain extent including multiple cells. A paging indicator channel is used to indicate the allocation of the paging channel multiplexed on the radio resources. Accordingly, the paging channel and the paging indicator channel transmit the same information content in the cells within the same location registration area.

Having been subjected to channel coding and data demodulation, the paging information and the paging indicator are multiplied by (1) the intracell common scrambling code. It is desirable to apply diversity transmission in combination with the multiplication of the intracell common scrambling code so as to achieve delay diversity in multiple sectors of the cell.

With OFDM schemes, the benefit of path diversity (or delay diversity) can be achieved, while reducing intersymbol interference, as long as the propagation delay is within the guard interval. The delayed components of the paging channel or the paging indicator channel transmitted from the respective sectors on the downlink under application of delay diversity are combined and received at a radio frequency. Accordingly, the path diversity effect of the received OFDM signal is promoted, and the signal propagation property can be improved.

<Shared Data Channel>

Figure 8:
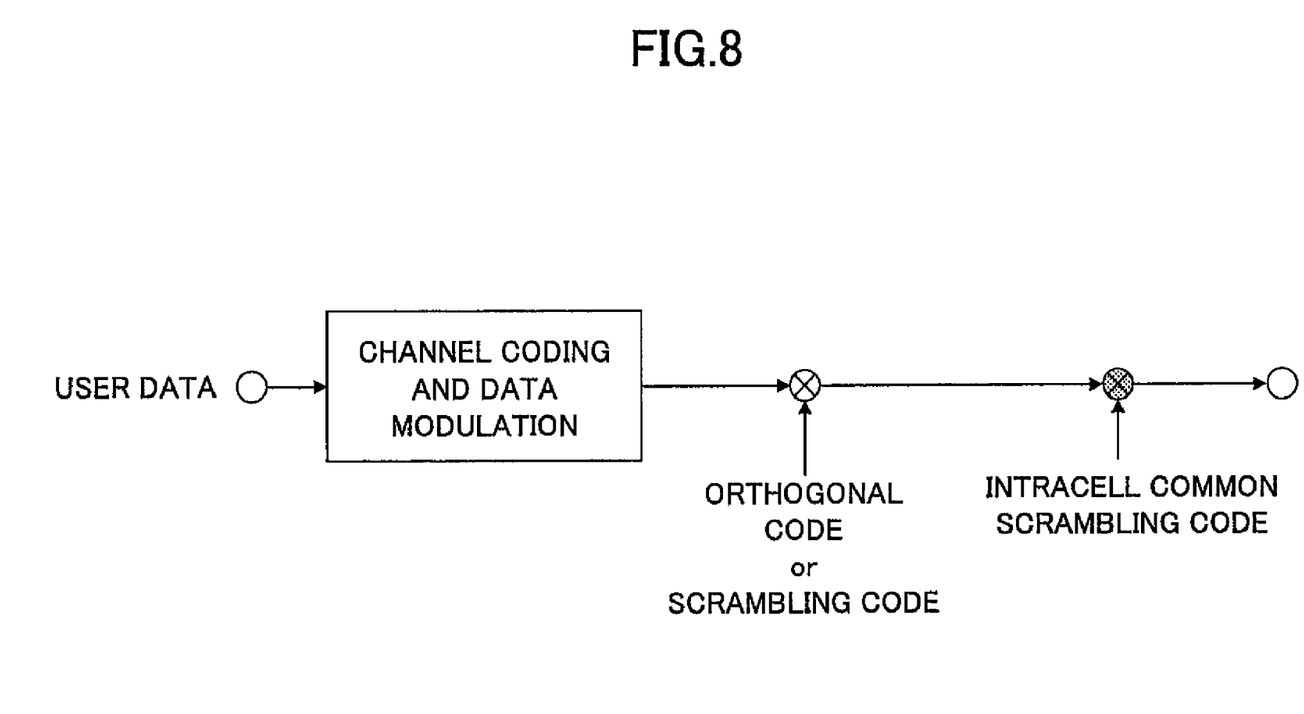
FIG. 8 is a schematic diagram for explaining an operation performed on a shared data channel.

FIG. 8 is a schematic diagram illustrating an operation performed on the shared data channel. The shared data channel transmits user data or upper-layer control signals. The shared data channel is unique to each sector in the cell, and transmitted to each of the users with or without spectrum spreading depending on the channel condition for the user. For example, if the user is located at the end of the cell, spectrum spreading is applied to reduce the interference from the adjacent cells. If the channel condition is satisfactory, spectrum spreading is not applied.

In the embodiment, when spectrum spreading is applied, an orthogonal code is used as the first code to be multiplied by the transmission signal. When spectrum spreading is not applied, a scrambling code unique to each sector, referred to as a unique sector scrambling code, is used as the first code to be multiplied by the transmission signal. In either case, the sector-identified transmission signal is further multiplied by the intracell common scrambling code.

In other words, channel coding and data modulation are applied to the transmission signal to be transmitted on the shared data channel, and the channel-coded and data-modulated transmission signal is multiplied by (1)(a) an orthogonal code when spectrum spreading is applied, or
  (b) a unique sector scrambling code when spectrum spreading is not applied; and then multiplied by
(2) an intracell common scrambling code.

The channel coding and the data modulation may be adaptively varied using an adaptive rate channel coding and data modulation technique according to the channel condition. When an orthogonal code is applied (under spectrum spreading), a set of orthogonal codes is allocated such that the shared data channel becomes orthogonal between sectors in the cell.

Depending on whether spectrum spreading is applied, the first code is switched between the orthogonal code and the unique sector scrambling code. This can be realized by a unified switching operation for selecting and outputting the code pattern according to the channel type, which may be implemented by the channel-type-based multiplication code switching unit 13. When the orthogonal code is applied, the period of the code pattern is relatively short, such as 4 to 16. For the unique sector scrambling code, a longer code pattern corresponding to the length of a radio frame (e.g., 10 ms) is used in order to sufficiently randomize the intersector interference in the cell and the influence of the interference from the adjacent cells.

With this arrangement, when spectrum spreading is applied to two or more sectors in the same cell, the shared data channel is transmitted so as to be orthogonal between the sectors in that cell. In addition, by applying the intracell common scrambling code to the orthogonalized transmission signal, influence of interference from the adjacent cells can be randomized while maintaining the orthogonality of the channel between sectors in the cell. Consequently, high-quality signal transmission with less intersector interference is realized.

The same applies to the case where spectrum spreading is not applied. Since the signal to be transmitted is identified for each sector under the application of a unique sector scrambling code, intersector interference can be reduced <Associated Control Channel>

Figure 9:
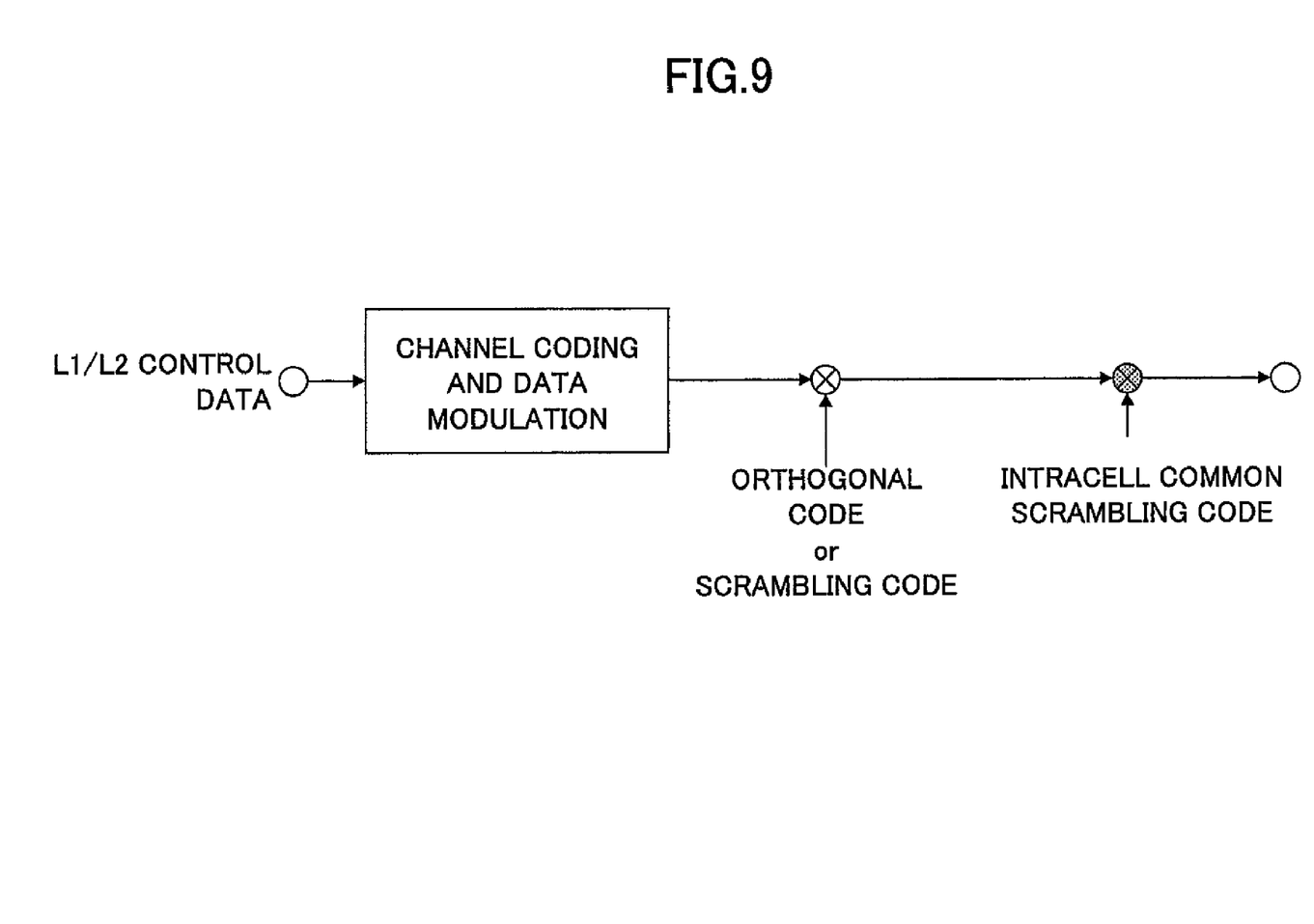
FIG. 9 is a schematic diagram for explaining an operation performed on an associated control channel associated with the shared data channel.

FIG. 9 is a schematic diagram illustrating an operation performed on a control channel associated with the shared data channel. An illustrative example of the associated control channel used in the embodiment is a Layer 1/Layer 2 (L1/L2) control channel. The associated control channel transmits control bits related to the shared data channel, such as control bits representing information about the modulation scheme and the coding rate when link adaptation is applied;

ACK/NACK re-transmission control bits used when hybrid automatic repeat request (HRQ) is employed; or control bits representing information about allocation of radio resources when packet scheduling is employed.

In the sectorized cell architecture, information unique to a sector is transmitted on the associated control channel.

The associated control channel transmitted in association with the shared data channel may or may not be spread, like the shared data channel, depending on the situation. Accordingly, the control data to be transmitted on the associated control channel are channel-coded and data-modulated, then multiplied by (1-a) an orthogonal code when spectrum spreading is applied, or (1-b) a unique sector scrambling code when spectrum spreading is not applied, and further multiplied by (2) an intracell common scrambling code.

Under the application of spectrum spreading, a set of orthogonal codes is allocated such that the associated control channel becomes orthogonal between sectors in the cell.

The code pattern to be applied to the transmission signal is switched between the orthogonal code and the unique sector scrambling code depending on whether or not spectrum spreading is applied. This operation is implemented by the unified control and selection of the code pattern by the multiplication code switching unit 13. As for the period of the code pattern used for the associated control channel, the orthogonal code has a relatively short period such as 4 to 16, while the unique sector scrambling code has as long period as the radio frame length (e.g., 10 ms) to sufficiently randomize the influence of interference from the other sectors in the cell or from the adjacent cells, as in the operation for the shared data channel.

With this arrangement, when spectrum spreading is employed in two or more sectors in the cell, associated control channels to be transmitted are made orthogonal to each other between the sectors in the cell. In addition, by multiplying the transmission signal by the intracell common scrambling code, the influence of interference from the adjacent cells can be randomized, while maintaining the orthogonality of the channels between the sectors of the same base station. Consequently, high-quality signal transmission with less intersector interference can be realized.

When spectrum spreading is not employed, the control signal to be transmitted is converted to the unique sector scrambling code so that intersector interference can be randomized.

<MBMS Channel>

Figure 10:
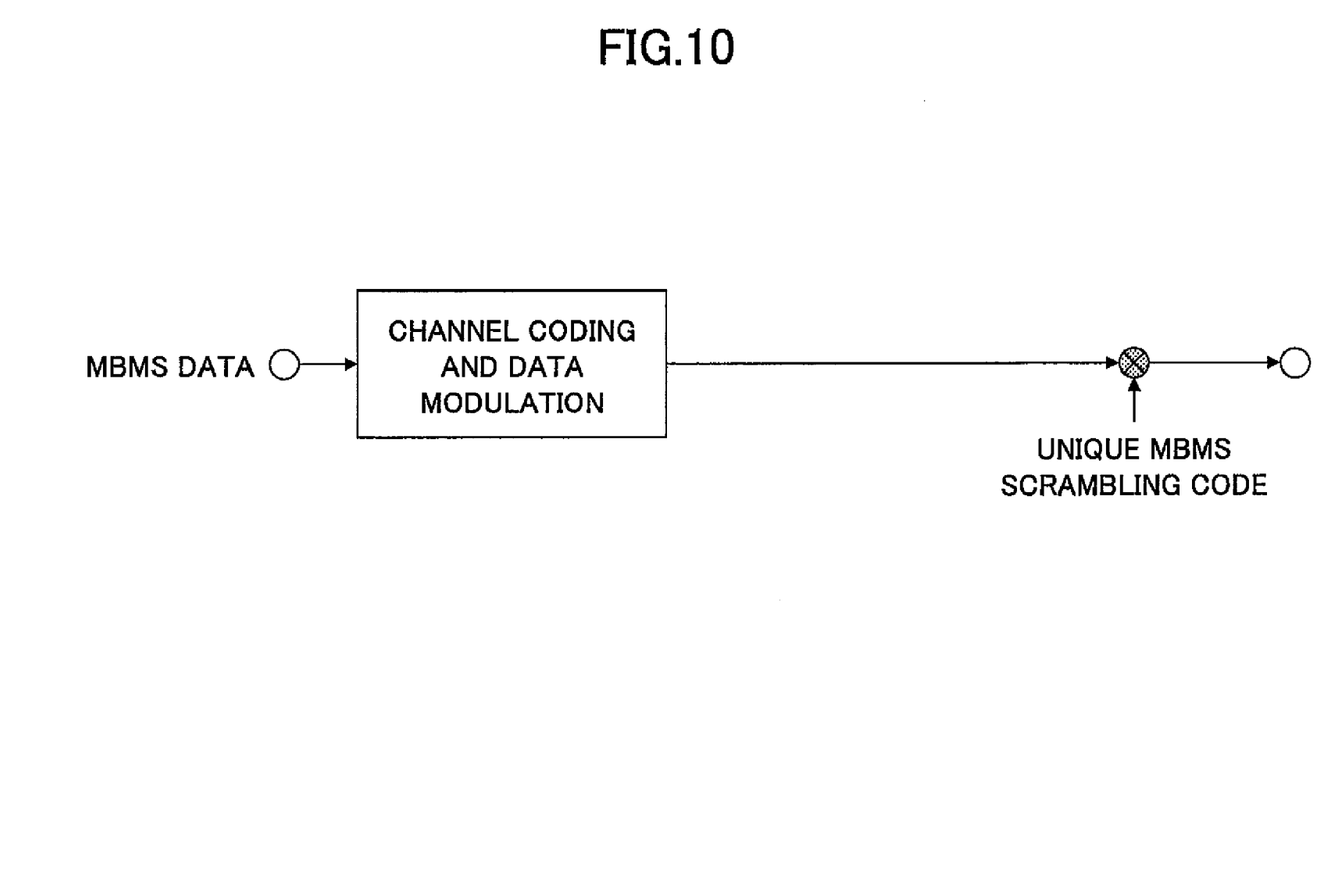
FIG. 10 is a schematic diagram for explaining an operation performed on a multimedia broadcasting and multicasting service (MBMS) channel.

FIG. 10 is a schematic diagram illustrating the operation performed on a Multimedia Broadcast Multicast Service (MBMS) channel.

An MBMS channel is used to transmit user data to specific users (multicast) or unspecified users (broadcast) existing in a certain expanse of MBMS area including multiple cells, and the same information content is transmitted to the sectors in the MBMS area. Two or more MBMS channels may be available in an MBMS area.

After channel coding and data modulation, the MBMS data sequence is multiplied by (1) a unique MBMS scrambling code as the channel-type-based first code.

It is preferred to combine diversity transmission with the multiplication so as to achieve delay diversities from multiple sectors in the cell.

The MBMS channels having propagated from the multiple sectors under the application of delay diversity are combined at a radio frequency and received at each MBMS user. The path diversity effect for the OFDM signal can be increased and the signal transmission characteristics are improved. Because different MBMS channels are provided with different scrambling codes, interference between MBMS channels can be randomized. With the MBMS scrambling code unique to each MBMS channel, interference from ordinary unicast channels can also be randomized.

Figure 11:
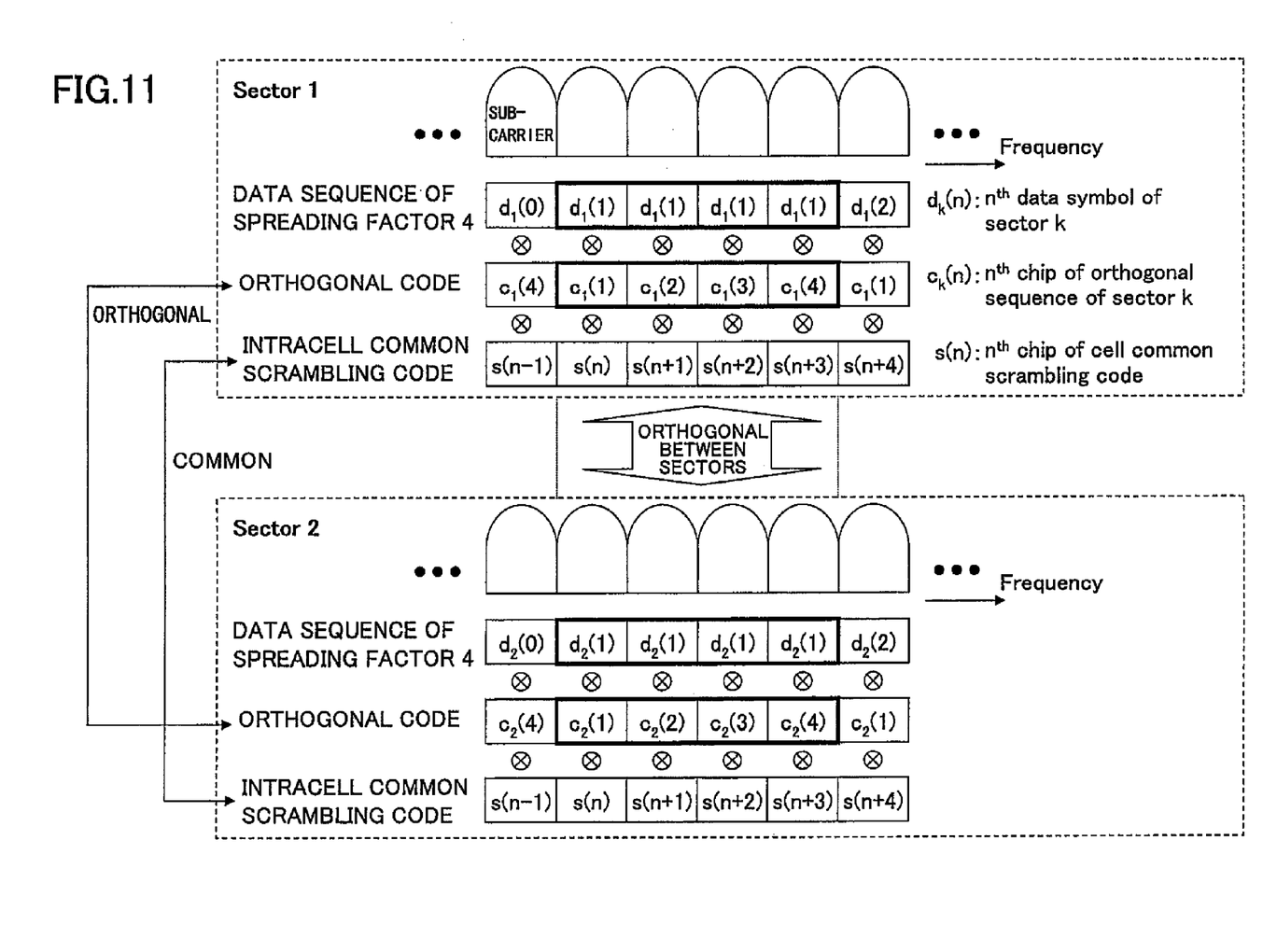
FIG. 11 is a schematic diagram illustrating intersector orthogonalization in a cell when spectrum spreading is applied.

FIG. 11 is a diagram illustrating orthogonalization between sectors in the same base station (cell) under application of spectrum spreading. In this example, the spreading factor is four (4). Each of the symbols of the user data signal $d_1$ in Sector 1 is spread to four chips. The spread symbol sequence is multiplied by orthogonal code $c_1$, and further multiplied by intracell common scrambling code S commonly used among the sectors in the same cell. Similarly, Each of the symbols of the user data signal $d_2$ in Sector 2 is spread to four chips. The spread symbol sequence is multiplied by orthogonal code $c_2$, and further multiplied by intracell common scrambling code.

Because the orthogonal codes $c_1$ and $c_2$ are orthogonal to each other, the data sequence of the user in Sector $c_1$ and the data sequence of the user in Sector $c_2$ are orthogonal to each other. Accordingly, each of the channels can be identified with les intersector interference.

By applying the intracell common scrambling code S commonly used among the sectors in the same base station, influence of interference from the adjacent cells can be randomized.

As has been described above, the multiplication code to be applied to the transmission signal is selected and switched according to the type of a physical channel under unified control. This arrangement can achieve efficient channel transmission.

When sector identification is required for signal transmission, orthogonalization or sector-based signal scrambling is applied to reduce intersector interference.

By applying an intracell common scrambling code to the transmission signal after the channel identification, influence of interference from the adjacent cells is reduced while maintaining the channel orthogonality or randomness between the sectors.

By combining delay diversity transmission with channel identification, signal transmission characteristics can be further improved.

This international application claims the benefit of the priority date based upon Japanese Patent Application No. 2006-009296 filed Jan. 17, 2006, the entire content of which is incorporated herein by reference.

The invention claimed is:

1. A channel transmission method comprising the steps of:
generating one of multiple transmission signals to be transmitted on a corresponding one of different types of downlink physical channels used in a mobile communication system with a sectorized cell architecture;
selecting and switching a pattern of a first code from an orthogonal code, a unique sector scrambling code, and a unique multimedia-broadcast-multicast-service scrambling code according to the type of a corresponding physical channel to multiply the generated said one transmission signal by the selected pattern of the first code under unified control;
if the transmission signal is multiplied by the orthogonal code or the unique sector scrambling code as the first code, then further multiplying the transmission signal by an intracell common scrambling code used in common among sectors in a same cell; and
transmitting the transmission signal multiplied by at least one of the first code and the intracell common scrambling code on the corresponding physical channel.

2. The channel transmission method of claim 1, wherein:
the transmission signal is a pilot signal to be transmitted on a pilot channel;
an orthogonal code orthogonal between the sectors in the same cell is selected as the first code to be applied to the pilot signal; and
the pilot signal multiplied by the orthogonal code is further multiplied by the intracell common scrambling code.

3. The channel transmission method of claim 1, wherein:
the transmission signal is a broadcast signal to be transmitted on a broadcast channel;
an orthogonal code orthogonal between the sectors in the same cell is selected as the first code to be applied to the broadcast signal; and
the broadcast signal multiplied by the orthogonal code is further multiplied by the intracell common scrambling code.

4. The channel transmission method of claim 1, further comprising the step of:
performing channel coding and data modulation on a broadcast signal before the broadcast signal is multiplied by the first code.

5. The channel transmission method of claim 1, wherein:
the transmission signal is paging information or a paging indicator to be transmitted on a paging channel or a paging indicator channel; and the paging information or the paging indicator is multiplied by the intracell common scrambling code and transmitted without application of the first code.

6. The channel transmission method of claim 5, wherein the paging information or the paging indicator multiplied by the intracell common scrambling code is transmitted by delay diversity transmission.

7. The channel transmission method of claim 1, wherein:
the transmission signal is user data or an upper-layer control signal to be transmitted on a shared data channel;
an orthogonal code orthogonal between the sectors in the same cell or a unique sector scrambling code unique to each of the sectors is selected as the first code depending on whether spectrum spreading is applied; and
the user data or the upper-layer control signal multiplied by the orthogonal code or the unique sector scrambling code is further multiplied by the intracell common scrambling code.

8. The channel transmission method of claim 1, wherein:
the transmission signal is a control signal to be transmitted on an associated control channel associated with a shared data channel;
an orthogonal code orthogonal between the sectors in the same cell or a unique sector scrambling code unique to each of the sectors is selected as the first code depending on whether spectrum spreading is applied; and
the control signal multiplied by the first code is further multiplied by the intracell common scrambling code.

9. The channel transmission method of claim 1, wherein:
the transmission signal is MBMS data to be transmitted on a multimedia broadcast and multicast service channel; and
a unique MBMS scrambling code unique to the multimedia broadcast and multicast service channel is selected as the first code.

10. The channel transmission method of claim 9, wherein:
the MBMS data multiplied by the unique MBMS scrambling code is transmitted by delay diversity transmission.

11. A base station for mobile communication that manages a sectorized cell, comprising:
a signal generator configured to generate one of multiple transmission signals to be transmitted by a corresponding one of different types of physical channels;
a multiplication code switching unit configured to select and output a first code from an orthogonal code, a unique sector scrambling code, and a multimedia-broadcast-multicast-service scrambling code according to the type of a physical channel to be used to transmit the generated said one transmission signal in a unified manner, the selected first code being multiplied by the transmission signal;
a plurality of first multipliers, each configured to receive the first code selected according to the type of the physical channel and multiply the transmission signal by the first code;
a scrambling code multiplication unit configured to, if the transmission signal is multiplied by the orthogonal code or the unique sector scrambling code as the first code, further apply an intracell common scrambling code commonly used among sectors in the sectorized cell to the transmission signal; and
a transmission unit configured to transmit the transmission signal multiplied by at least one of the first code and the intracell common scrambling code.

12. The base station of claim 11, wherein:
the transmission unit includes a delay unit configured to perform delay diversity transmission.

13. The base station of claim 11, wherein:
the multiplication code switching unit switches and outputs one of code patterns of an orthogonal code orthogonal between sectors in a cell, a unique sector scrambling code, and a unique MBMS scrambling code unique to a multimedia broadcast and multicast service channel according to the type of the physical channel to be transmitted.

14. The base station of claim 11, wherein:
the multiplication code switching unit selects and outputs an orthogonal code pattern to carry out spectrum spreading when the spectrum spreading is applied to transmission of a shared data channel or an associated control channel associated with the shared data channel, and outputs a unique sector scrambling code pattern when spectrum spreading is not applied.

15. A channel transmission method comprising the steps of:
generating one of multiple transmission signals to be transmitted on a corresponding one of different types of downlink physical channels used in a mobile communication system with a sectorized cell architecture;
selecting a first code according to the type of the corresponding physical channel to multiply the transmission signal by the first code;
further multiplying the transmission signal by an intracell common scrambling code used in common among sectors in a same cell; and
transmitting the transmission signal multiplied by at least one of the first code and the intracell common scrambling code on the corresponding physical channel,
wherein:
the transmission signal is paging information or a paging indicator to be transmitted on a paging channel or a paging indicator channel; and
the paging information or the paging indicator is multiplied by the intracell common scrambling code and transmitted without application of the first code.

16. A channel transmission method comprising the steps of:
generating one of multiple transmission signals to be transmitted on a corresponding one of different types of downlink physical channels used in a mobile communication system with a sectorized cell architecture;
selecting a first code according to the type of the corresponding physical channel to multiply the transmission signal by the first code;
further multiplying the transmission signal by an intracell common scrambling code used in common among sectors in a same cell; and
transmitting the transmission signal multiplied by at least one of the first code and the intracell common scrambling code on the corresponding physical channel,
wherein:
the transmission signal is paging information or a paging indicator to be transmitted on a paging channel or a paging indicator channel,
the paging information or the paging indicator is multiplied by the intracell common scrambling code and transmitted without application of the first code, and
the paging information or the paging indicator multiplied by the intracell common scrambling code is transmitted by delay diversity transmission.

17. A channel transmission method comprising the steps of:
- generating one of multiple transmission signals to be transmitted on a corresponding one of different types of downlink physical channels used in a mobile communication system with a sectorized cell architecture;
- selecting a first code according to the type of the corresponding physical channel to multiply the transmission signal by the first code;
- further multiplying the transmission signal by an intracell common scrambling code used in common among sectors in a same cell; and
- transmitting the transmission signal multiplied by at least one of the first code and the intracell common scrambling code on the corresponding physical channel, wherein:
- the transmission signal is user data or an upper-layer control signal to be transmitted on a shared data channel;
- an orthogonal code orthogonal between the sectors in the same cell or a unique sector scrambling code unique to each of the sectors is selected as the first code depending on whether spectrum spreading is applied; and
- the user data or the upper-layer control signal multiplied by the first code is further multiplied by the intracell common scrambling code.

18. A channel transmission method comprising the steps of:
- generating one of multiple transmission signals to be transmitted on a corresponding one of different types of downlink physical channels used in a mobile communication system with a sectorized cell architecture;
- selecting a first code according to the type of the corresponding physical channel to multiply the transmission signal by the first code;
- further multiplying the transmission signal by an intracell common scrambling code used in common among sectors in a same cell; and
- transmitting the transmission signal multiplied by at least one of the first code and the intracell common scrambling code on the corresponding physical channel, wherein:
- the transmission signal is a control signal to be transmitted on an associated control channel associated with a shared data channel;
- an orthogonal code orthogonal between the sectors in the same cell or a unique sector scrambling code unique to each of the sectors is selected as the first code depending on whether spectrum spreading is applied; and
- the control signal multiplied by the first code is further multiplied by the intracell common scrambling code.

19. A base station for mobile communication that manages a sectorized cell, comprising:
- a signal generator configured to generate one of multiple transmission signals to be transmitted by a corresponding one of different types of physical channels;
- a multiplication code switching unit configured to select and output a first code according to the type of the physical channel to be used to transmit the transmission signal in a unified manner, the selected first code being multiplied by the transmission signal;
- a scrambling code multiplication unit configured to apply an intracell common scrambling code commonly used among sectors in the sectorized cell to the transmission signal; and
- a transmission unit configured to transmit the transmission signal multiplied by at least one of the first code and the intracell common scrambling code, wherein:
- the multiplication code switching unit selects and outputs an orthogonal code pattern to carry out spectrum spreading when the spectrum spreading is applied to transmission of a shared data channel or an associated control channel associated with the shared data channel, and outputs a unique sector scrambling code pattern when spectrum spreading is not applied.

* * * * *